A. K. SUTHERLAND.
MILK BOTTLE CARRIER.
APPLICATION FILED JAN. 18, 1919.
1,308,742.
Patented July 1, 1919.
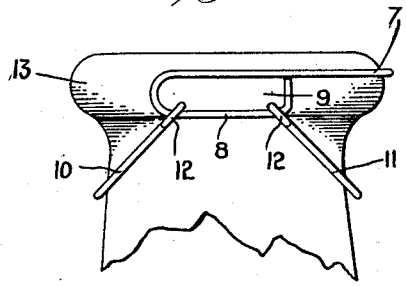
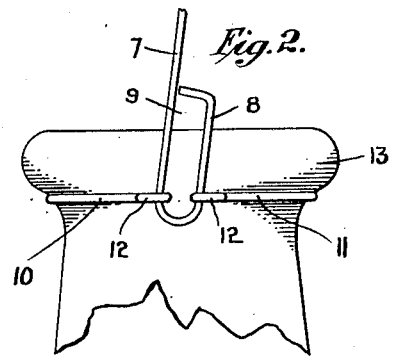
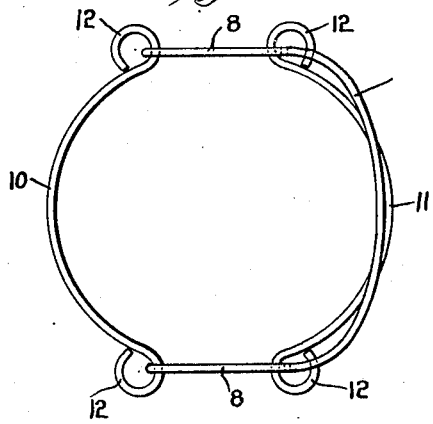
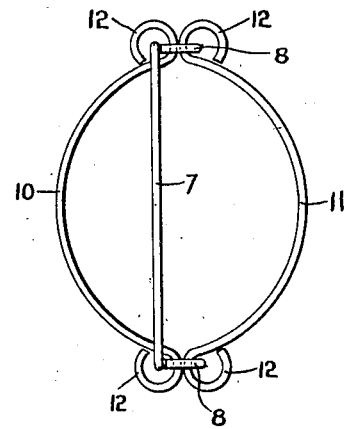
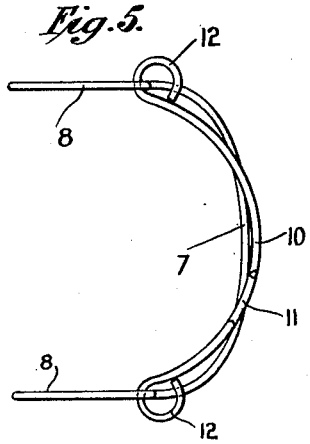
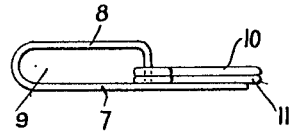
INVENTOR
Alexander K. Sutherland
BY
Mitchell + Allyn
ATTORNEYS

UNITED STATES PATENT OFFICE.

ALEXANDER K. SUTHERLAND, OF NEW BRITAIN, CONNECTICUT, ASSIGNOR OF ONE-HALF TO HERBERT O. ROCKWELL, OF NEW BRITAIN, CONNECTICUT.

MILK-BOTTLE CARRIER.

1,308,742.  Specification of Letters Patent.  Patented July 1, 1919.

Application filed January 18, 1919. Serial No. 271,800.

*To all whom it may concern:*

Be it known that I, ALEXANDER K. SUTHERLAND, subject of the King of Great Britain, residing at New Britain, Conn., have invented a new and useful Milk-Bottle Carrier, of which the following is a specification.

The objects of my present invention are to provide a simple, inexpensive and effective carrier for milk bottles and the like.

A further object of the invention is to provide a carrier which when not in use may be folded into compact form.

The invention consists in brief of a pair of gripping links adapted to embrace the opposite sides of the neck of a bottle or the like and a bail connecting the links and having a sliding connection therewith by means of which the links may be separated or brought together, at will.

Other features of the invention and details of construction will appear as the specification proceeds.

In the accompanying drawing I have illustrated the invention embodied in a practical commercial form, in which:

Figure 1, is a side elevation of the carrier as spread open in the act of applying the same to the neck of a milk bottle or similar receptacle.

Fig. 2, is a similar view showing the bail or handle turned up to bring the coöperating links into supporting engagement beneath the shoulder at the rim of the bottle.

Figs. 3 and 4 are plan views of the carrier in the two positions shown in Figs. 1 and 2.

Figs 5 and 6 are detail views showing the carrier folded as when not in use.

The bail which is designated 7 is shown formed of relatively stiff wire bent into the form of an arch and provided at its opposite ends with reversely bent portions 8 forming elongated loops or eyes 9.

10 and 11 are the so-called segmental links for engagement with the opposite sides of the bottle neck. These links also are shown as constructed of strong wire twisted at the ends into eyes 12 to engage in the loops in the opposite ends of the bail.

It will be apparent from the illustration and the description thus far that when the bail is turned flatwise, or substantially in line with the links, as in Figs. 1 and 3, the link 11 can slide in the elongated loops in the ends of the bail away from the first link. In this way the links can be separated or spread apart sufficiently to enable them to pass over the neck of a milk bottle, for instance, and beneath the annular shoulder or bead 13 at the mouth thereof. When thus positioned beneath the shoulder, the bail may be turned up into the position indicated in Figs. 2 and 4, whereupon the bail, pivoting upon the connections with the first link 10, will act as a lever and by means of the sliding connection with the second link will draw the second link toward the first, thus bringing the two links together into holding engagement beneath the shoulder of the bottle. The loops in the ends of the bail are designed with a major axis long enough to permit a relatively wide separation of the links and with the minor axis short enough to insure the links being drawn closely enough together to properly coöperate with the article for which the carrier is intended.

When not in use both the links may be slid along the elongated loops and be folded back onto the handle portion of the bail as indicated in Figs. 5 and 6. This enables the carrier being folded into compact form for storage and shipment. The device is inexpensive, occupies but small space when not in use, and may be quickly applied to the bottle, the mere act of applying the device and turning the handle up into position for carrying, serving to effect the proper engagement of the device with the article to be supported.

I claim:—

1. A bottle carrier comprising, a bail, a link for engaging one side of a bottle neck pivotally connected at its opposite ends with the opposite ends of said bail and a coöperating link for engaging the opposite side of the bottle neck slidably connected at its opposite ends with the opposite end portions of the bail and having a sliding pivotal movement on the opposite end portions of the bail away from the first link to enable separation of the links for engagement of the same over the bottle neck and said bail adapted when turned on the first link as a pivot, to act as a lever drawing the second link by means of said sliding connections toward the first link and into holding engagement with the bottle neck.

2. A bottle carrier comprising, a bail having elongated loops in the opposite ends thereof and coöperating links having their opposite ends slidably engaged in said elongated loops in the ends of the bail, whereby said bail may be turned in one direction to spread the links and may be turned in the opposite direction to draw the links together.

3. A bottle carrier comprising, a wire bail having its ends doubled back upon themselves into elongated loops and segmental wire links having their ends slidably engaged in said elongated loops, whereby the links may be separated by turning the bail to bring the elongated loops into longitudinal alinement with the links and whereby the links may be drawn together by turning the bail to bring the elongated loops substantially transversely of the links.

ALEXANDER K. SUTHERLAND

Copies of this patent may be obtained for five cents each, by addressing the "Commissioner of Patents, Washington, D. C."